(12) United States Patent
Kim et al.

(10) Patent No.: US 8,149,233 B2
(45) Date of Patent: Apr. 3, 2012

(54) CONTROLLER FOR GENERATING VIDEO SIGNAL, SIMULATION SYSTEM COMPRISING THE SAME, AND METHOD OF GENERATING VIDEO SIGNAL

(75) Inventors: Hyun-chul Kim, Yongin-si (KR); In-seung Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1115 days.

(21) Appl. No.: 11/305,132

(22) Filed: Dec. 19, 2005

(65) Prior Publication Data

US 2006/0184331 A1 Aug. 17, 2006

(30) Foreign Application Priority Data

Feb. 15, 2005 (KR) .................. 10-2005-0012409

(51) Int. Cl.
*G06F 3/038* (2006.01)
*G09G 5/00* (2006.01)

(52) U.S. Cl. ........ 345/213; 345/208; 348/181; 348/189; 715/716; 715/771

(58) Field of Classification Search .................. 715/716, 715/771; 345/208, 213; 348/181, 189
See application file for complete search history.

(56) References Cited

U.S. PATENT DOCUMENTS

| 2003/0001896 A1* | 1/2003 | Johnson et al. ................ 345/771 |
| 2003/0018446 A1* | 1/2003 | Makowski et al. ........... 702/123 |
| 2005/0035966 A1* | 2/2005 | Pasquarette et al. .......... 345/440 |
| 2005/0039160 A1* | 2/2005 | Santori et al. ................. 717/104 |
| 2005/0257195 A1* | 11/2005 | Morrow et al. ............... 717/109 |

FOREIGN PATENT DOCUMENTS

| JP | 09-178779 | 7/1997 |
| KR | 0127155 | 3/1997 |
| KR | 1998-022722 | 7/1998 |
| KR | 1998-047661 | 9/1998 |

* cited by examiner

*Primary Examiner* — Alexander Eisen
*Assistant Examiner* — Viet Pham
(74) *Attorney, Agent, or Firm* — Roylance, Abrams, Berdo and Goodman, LLP

(57) ABSTRACT

A system and method is provided for generating a video signal including a signal generator to generate the video signal, a user setting part to allow a user to set information for generating the video signal, and a controller to control the signal generator to generate the video signal on the basis of the information when the information is set through the user setting part. Thus, the system provides a controller for generating a video signal, a simulation system comprising the same, and a method of generating the video signal, in which a desired new video signal is generated or adjusted on the basis of information for generating the video signal input by a user.

14 Claims, 6 Drawing Sheets

CONTROLLER FOR GENERATING VIDEO SIGNAL, SIMULATION SYSTEM COMPRISING THE SAME, AND METHOD OF GENERATING VIDEO SIGNAL

CROSS-REFERENCE TO RELATED APPLICATIONS

This application claims the benefit under 35 U.S.C. §119 (a) of Korean Patent Application No. 10-2005-0012409, filed in the Korean Intellectual Property Office on Feb. 15, 2005, the entire disclosure of which is incorporated herein by reference.

BACKGROUND OF THE INVENTION

1. Field of the Invention

The present invention relates to a controller for generating a video signal, a simulation system comprising the same, and a method of generating the video signal. More particularly, the present invention relates to a controller for generating a video signal, a simulation system comprising the same, and a method of generating the video signal, in which a video signal is controlled to be generated on the basis of information input by a user.

2. Description of the Related Art

In general, a video signal generator generates a standard video signal on the basis of a previously stored video signal.

For example, a typical video signal generator is used in inspecting display devices. The video signal generator outputs a standard video signal to the display device, thereby allowing a user to inspect whether the display device displays a picture normally, based on the standard video signal.

Further, to inspect whether the display device can display a picture normally even though it receives an abnormal video signal from a video signal source, an abnormal video signal having a predetermined level is supplied as the video signal. Here, the abnormal video signal is a video signal that is beyond a normal level range.

Therefore, an inspection can be performed to determine whether the display device is designed to display a picture normally even though it receives an abnormal video signal, whether the display device can display a picture based on the abnormal video signal within a designed level range, and so on. Thus, a process is needed for generating a desired video signal by adjusting the level of the input video signal, or regenerating the abnormal video signal output from the video signal source.

Moreover, to ensure the reliability of the display device, the display device is required to be inspected with regard to video signals of various levels.

However, the conventional video signal generator outputs only a stored video signal, so that there is a limited ability to inspect the display device with regard to video signals of various levels.

Accordingly, a need exists for a system and method for generating a video signal, in which a video signal is controlled to be generated on the basis of information input by a user.

SUMMARY OF THE INVENTION

Accordingly, it is an aspect of the present invention to substantially solve the above and other problems, and provide a controller for generating a video signal, a simulation system comprising the same, and a method of generating the video signal, in which a desired new video signal is generated or adjusted on the basis of information input by a user.

Additional aspects and advantages of the present invention will be set forth in part in the description which follows and, in part, will be obvious from the description, or may be learned by practice of embodiments of the present invention.

The foregoing and other aspects of the present invention are substantially achieved by providing a simulation system for generating a video signal comprising a signal generator to generate the video signal, a user setting part to allow a user to set information for generating the video signal, and a controller to control the signal generator to generate the video signal on the basis of the information when the information is set through the user setting part.

According to an aspect of the present invention, the simulation system further comprises a signal analyzer to detect and analyze a video signal output from an external source, wherein the controller controls the signal generator to regenerate the video signal supplied from the external source on the basis of an analyzed result of the signal analyzer.

According to another aspect of the present invention, the simulation system further comprises signal storage to store information for generating the video signal, wherein the controller adjusts the video signal generated by the signal generator on the basis of changed information when the information for generating the video signal stored in the signal storage is changed through the user setting part.

According to another aspect of the present invention, the information for generating the video signal comprises at least one of frequency, level, ringing, monotonic, and timing of the video signal.

According to another aspect of the present invention, the simulation system further comprises a display, wherein the video signal generated by the signal generator is displayed on the display.

The foregoing and other aspects of the present invention are also achieved by providing a control device for generating a video signal, comprising a user setting part and a controller for providing a corresponding command to an external signal generator to generate a video signal on the basis of information when the information for generating the video signal is set through the user setting part.

According to another aspect of the present invention, the control device further comprises signal storage to store information for generating the video signal, wherein the controller adjusts the video signal generated by the signal generator on the basis of changed information when the information for generating the video signal stored in the signal storage is changed through the user setting part.

The foregoing and other aspects of the present invention are also achieved by providing a method of generating a video signal, comprising the steps of inputting information for generating the video signal, setting the input information, and generating a video signal on the basis of the set information.

According to another aspect of the present invention, the method further comprises the steps of detecting a video signal output from a predetermined signal source, analyzing the detected video signal, and regenerating the detected video signal on the basis of an analyzed result.

According to another aspect of the present invention, the method further comprises the steps of storing information about the video signal, and adjusting the video signal to be generated on the basis of changed information when the stored information about the video signal is changed.

According to another aspect of the present invention, the method further comprises the step of displaying a picture based on the generated video signal.

BRIEF DESCRIPTION OF THE DRAWINGS

These and other aspects and advantages of the present invention will become apparent and more readily appreciated from the following description of exemplary embodiments, taken in conjunction with the accompany drawings, of which.

Throughout the drawings, like reference numerals will be understood to refer to like parts, components and structures.

DETAILED DESCRIPTION OF THE EXEMPLARY EMBODIMENTS

Reference will now be made in detail to embodiments of the present invention, examples of which are illustrated in the accompanying drawings. The exemplary embodiments are described below so as to explain aspects of the present invention by referring to the figures.

Figure 1:
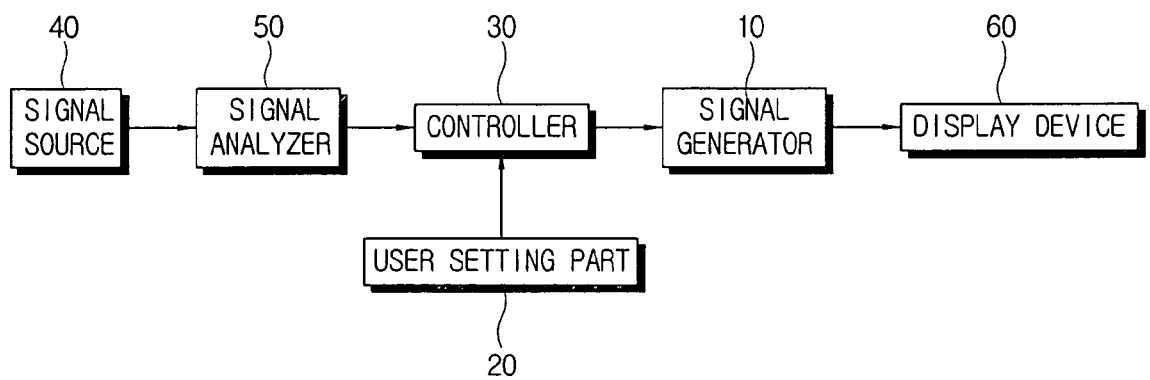
FIG. 1 is a control block diagram of a simulation system for generating a video signal according to a first embodiment of the present invention.

FIG. 1 is a control block diagram of a simulation system for generating a video signal according to a first embodiment of the present invention.

As shown in FIG. 1, a simulation system for generating a video signal according to the first embodiment of the present invention comprises a signal generator 10 to generate a video signal, a user setting part 20 to allow a user to set information for generating a video signal, and a controller 30 to control the signal generator 10 to generate the video signal on the basis of the set information.

Figure 3:
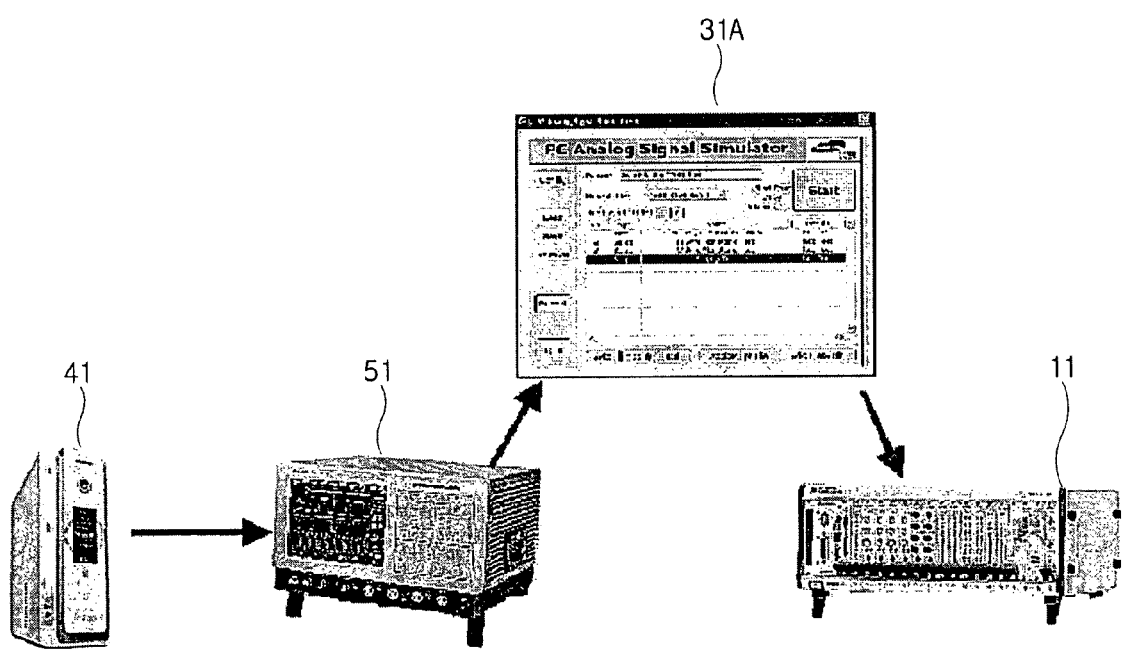
FIG. 3 is a layout view of a simulation system for generating a video signal according to a second embodiment of the present invention.

The signal generator 10 comprises a generator 11 (as shown in FIG. 3) to generate a video signal. Here, the generator 11 is controlled by the controller 30 to generate a stored standard signal and also a new signal based on the set information regarding signal resolution, frequency of vertical/horizontal synchronous signals, level, ringing, monotonic, timing, and so forth. When the resolution, frequency, level, ringing, monotonic, timing, and so forth are changed, the generator 11 can control the generation of the signal corresponding to the adjusted values.

The user setting part 20 comprises a button, keyboard or the like (not shown), to input information for generating a video signal, and can further comprise a user interface (UI) to generate a selection menu.

Here, the information for generating a video signal comprises the resolution, frequency, waveform level, and overshoot (that is, sync monotonic) of the video signal.

The controller 30 controls the signal generator 10 to generate a video signal on the basis of the information for generating a video signal, set by a user through the user setting part 20. Here, the controller 30 can comprise a test unit such as a computer or the like, having a software-driving program based on an operating system (OS). Further, the controller 30 can store the generated video signal.

When a user executes a program to input data for generating a video signal, the controller 30 controls the user interface to be displayed on a screen. Then, when a user inputs and sets information about the level of the video signal in order to generate a new video signal, or adjusts the level of the video signal by loading a previously stored signal script through the selection menu of the user interface displayed on the screen, the controller 30 controls the signal generator 10 to generate or adjust the video signal on the basis of the set or adjusted values.

A simulation system for generating a video signal according to the first embodiment of the present invention further comprises signal storage (not shown) to store information for generating a video signal.

Here, the signal storage stores information about a detected video signal and a generated video signal, wherein the information about the video signal comprises the resolution, frequency, waveform level, and the overshoot (that is, sync monotonic) of the video signal.

The signal storage can comprise a memory provided in the controller 30, but is not limited thereto. Alternatively, the signal storage may be provided in the signal generator 10 or the signal analyzer 50. The controller 30 reads out the information stored in the signal storage, and regenerates or changes the read information in accordance with a setting of the user setting part 20.

An exemplary operation of a controller for generating a video signal according to the first embodiment of the present invention will now be described with reference to FIG. 2.

Figure 2:
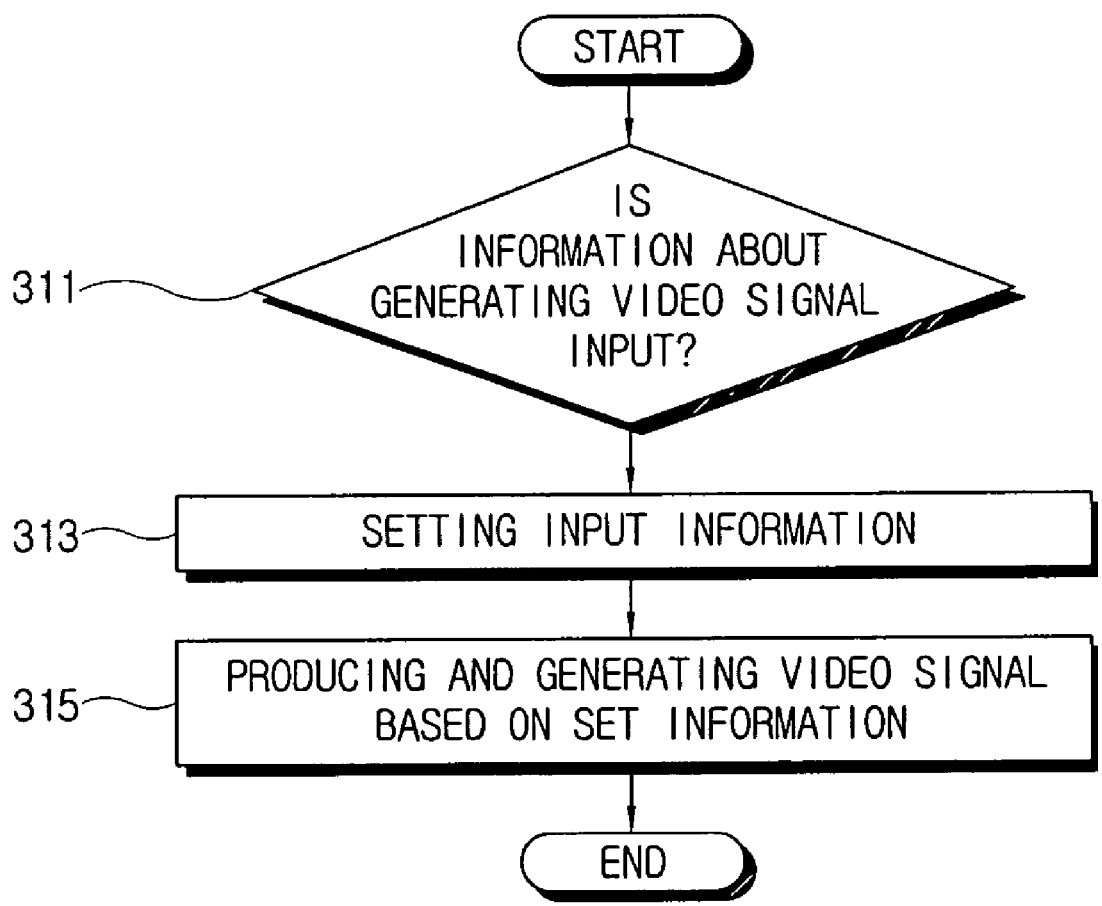
FIG. 2 is a control flowchart for generating a video signal according to the first embodiment of FIG. 1.

Referring to FIG. 2, when a user gives a command to drive a corresponding program to generate a video signal, the controller 30 controls a predetermined selection menu (that is, a UI) to be displayed on the screen. At operation 311, a user inputs information about the resolution, frequency, level, and so forth, for a new video signal through the user setting part 20. Then, at operation 313, the controller 30 sets information for generating the input video signal.

At operation 315, the controller 30 controls the signal generator 10 to generate a new video signal on the basis of the set information.

Thus, a user can input and set information about a desired signal via the corresponding program, thereby generating the desired signal.

A simulation system for generating a video signal according to a second embodiment of the present invention will now be described with reference to FIGS. 1, 3, 4 and 5.

A simulation system for generating a video signal according to the second embodiment of the present invention comprises the components of the first embodiment, and further comprises a signal analyzer 50 (as shown in FIG. 1) to detect and analyze a video signal output from an external signal source 40 (as shown in FIG. 1).

The signal analyzer 50 can comprise a device such as an oscilloscope 51 (for example, a TDS 7404 as shown in FIG. 3) or the like. The signal analyzer 50 analyzes a waveform of the video signal output from the signal source 40.

Further, the signal source 40 can comprise a graphic card provided in a personal computer 41 (as shown in FIG. 3), or the like, which can output a video signal.

For example, in the case where the graphic card is designed to output a signal based on video electronics standards association (VESA) discrete monitor timing (DMT) 1.0 standard, the oscilloscope 51 detects and analyzes whether the video signal is output depending on the corresponding standards. Thus, the signal analyzer 50 can detect and analyze whether the video signal is beyond the standard, that is, whether the video signal is abnormal.

FIG. 3 is a layout view of a simulation system for generating a video signal according to the second embodiment of the present invention.

As shown in FIG. 3, the simulation system for generating a video signal according to the second embodiment of the present invention comprises the oscilloscope 51 for receiving a video signal from the personal computer 41 employed as the signal source 40 and detecting an abnormal signal, a control program embodied on a computer-readable medium for providing a user interface display 31A and 31B for allowing a user to edit the video signal to be regenerated corresponding to the detection and analysis results of the oscilloscope 51, producing and/or storing data about the video signal on the basis of the information input by a user through the provided user interface, and adjusting the waveform of the stored video signal, and the generator 11 to generate the video signal in response to a command from the control program. The control program can collect information about the detected abnormal video signal, and output it as sequential signals.

Here, each of the oscilloscope 51, control program and the generator 11 comprises an interface to transmit and receive data.

Returning to FIG. 1, the simulation system according to the second embodiment of the present invention further comprises a display device 60.

The display device 60 processes the video signal input from the signal generator 10 through a predetermined routine, and displays it on a screen thereof. Here, the display device 60 may be comprised of a cathode ray tube (CRT), liquid crystal display (LCD), plasma display panel (PDP), or the like.

Therefore, the video signal generated by the signal generator 10 is output to the display device 60, so that a user can check whether the generated video signal is displayed normally through the screen.

When the oscilloscope 51 detects the abnormal video signal of the personal computer 41, the control program produces data about the detected video signal and the generator 11 then regenerates the abnormal video signal based on the produced data. The regenerated video signal is output to the display device 60, so that a user can check whether the abnormal video signal is displayed normally in the display device 60.

Further, a user can adjust (for example, increase or decrease) the level or the like, of the detected abnormal video signal, and check whether the video signal is displayed normally in the display device 60 in response.

Hereinbelow, a video signal produced according to the second embodiment of the present invention will be described with reference to the user interface based on the control program illustrated in FIGS. 3, 4 and 5.

Figure 4:
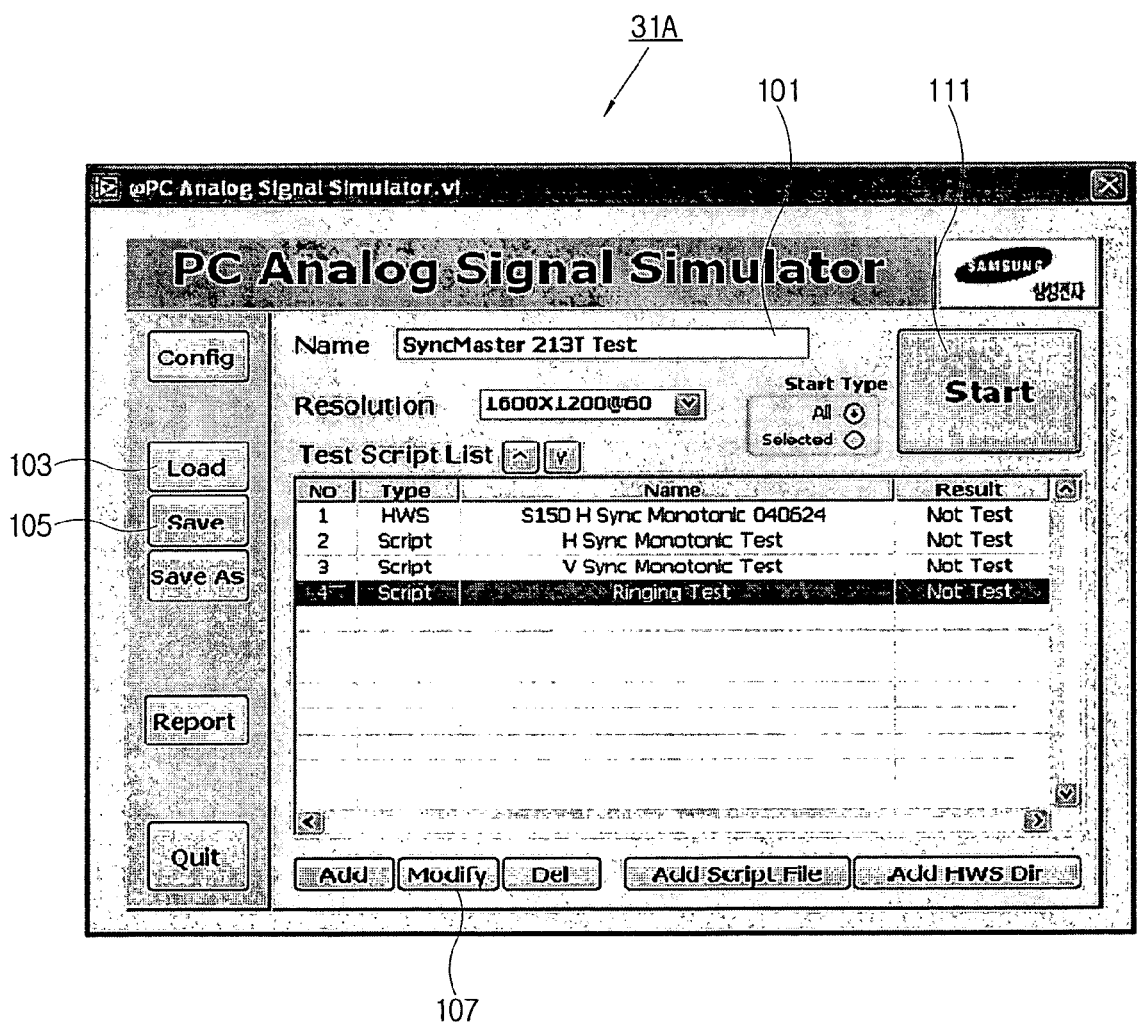
FIG. 4 shows a user interface screen of a control program according to the second embodiment of FIG. 3.
Figure 5:
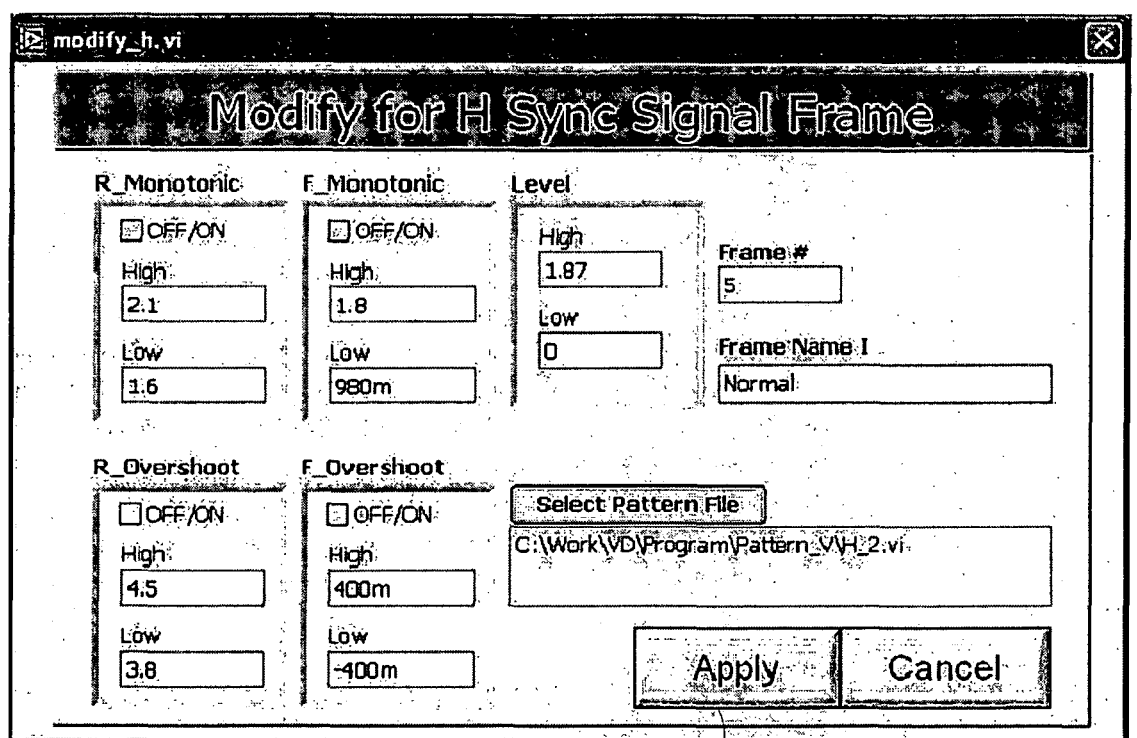
FIG. 5 shows a modify item selected in a user interface screen according to the second embodiment of FIG. 3.

As shown in FIGS. 4 and 5, when the control program is executed, various user interface screens 31A and 31B are displayed allowing a user to set information about a desired video signal to be produced.

Through the user interface of FIG. 4, a user can select a specification or the like, of a display device to be tested at 101.

A user can then select a load item at 103 to load information about a previously stored video signal. Further, a user can select a save item at 105 to save information about the video signal. The selection menu of the user interface may include various items in addition to those shown in FIG. 4.

When a user selects a modify item at 107, the controller 30 provides the user interface screen 31B as shown in FIG. 5, wherein the user interface screen 31B relates to the monotonic, overshoot, and the like, of the video signal.

Through the user interface displayed on the screen, a user can adjust the level, monotonic, overshoot, and so forth, of the video signal in detail. Then, when a user selects an apply item at 109 after adjusting the values of the video signal, the controller 30 sets the information about the video signal on the basis of the adjusted values, and provides the generator 11 with a corresponding command to generate the video signal based on the set information. Here, the control program is based on the OS, and embodied in a computer-readable medium of a test unit such as a computer or the like.

Figure 6:
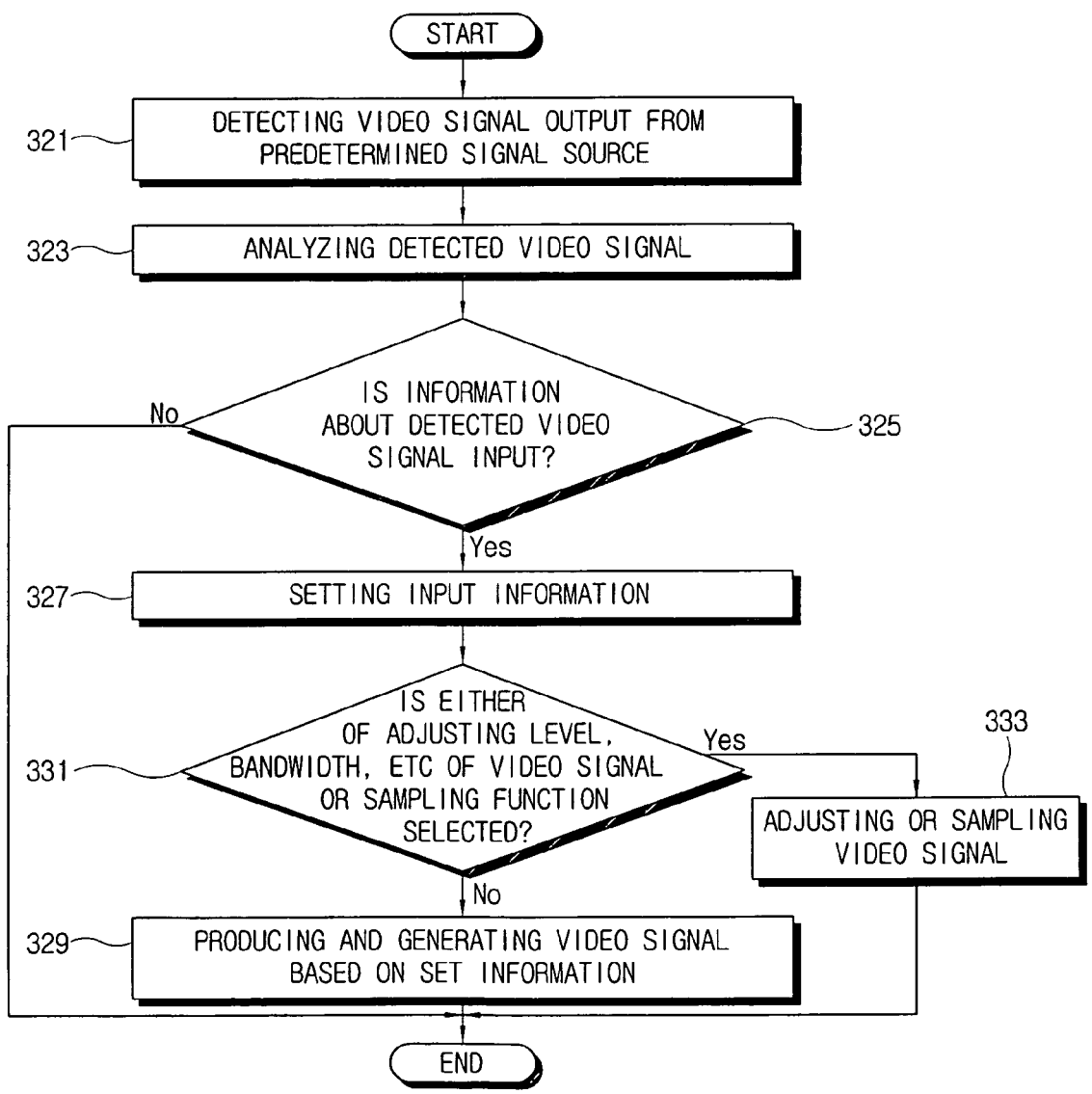
FIG. 6 is a control flowchart for generating a video signal according to the second embodiment of FIG. 3.

FIG. 6 is a control flowchart for generating a video signal according to the second embodiment of the present invention.

Referring to FIG. 6, at operation 321, the oscilloscope 51 detects the video signal output from the signal source 40 such as the personal computer 41. At operation 323, the oscilloscope 51 analyzes the waveform of the detected video signal.

Here, the oscilloscope 51 can detect the abnormal video signal output from the graphic card of the personal computer 41, and store it therein.

When a user executes the control program, the controller 30 displays the user interface screens 31A and 31B for producing the video signal. At operation 325, a user inputs the information about the video signal detected and analyzed by the oscilloscope 51 to the user interface of the control program. At operation 327, the input information is then set in the control program.

Then, at operation 331 a user selects a command to generate, adjust or sample the video signal and the controller 30 transmits a control signal corresponding to the set information to the generator 11. At operation 329, the generator 11 generates a video signal on the basis of the control signal. At this time, the display device 60 connected with the generator 11 displays a picture on the screen on the basis of the generated video signal.

At operation 333, when a user adjusts the resolution, frequency, level, bandwidth, and so forth, of the detected video signal, or selects a sampling function, the controller 30 controls the generator 11 to generate or sample a video signal on the basis of the adjusted information.

Thus, a desired video signal is generated, adjusted and sampled.

A method of inspecting a display device using a simulation system according to the second embodiment of the present invention will now be described with reference to FIG. 3.

When a video signal based on predetermined standards has a sync value of approximately 2.4V~4.5V (±10%), the oscilloscope 51 detects and analyzes the abnormal video signal that is beyond the standards among the video signals output from the graphic card of the personal computer 41.

Then, a user inputs the information about the detected and analyzed video signal of the personal computer 41 through the user interface screens 31A and 31B based on the control program.

When a user selects a signal generation button 111 provided in the user interface screen 31A of FIG. 4 based on the control program, the controller 30 transmits a corresponding command to the generator 11 on the basis of the input information. Then, the generator 11 regenerates the detected video signal corresponding to the received command, and outputs the regenerated video signal to the display device.

Thus, a user can determine whether the video signal is normal or abnormal on the basis of a picture displayed on the display device.

In the case where the display device is designed to receive and process a video signal having a sync value of approximately 2.4V~4.5V (±20%), which leaves a margin larger than the margin of the sync value of the video signal by ±10%, the display device can normally display a picture based on the video signal output from the personal computer 41 as long as the sync value of the video signal is within the processable sync margin of the display device, even though the video signal is beyond the standards, that is, even though the video signal output from the personal computer 41 is abnormal.

Hence, the level of the video signal is changed and adjusted to be produced and generated as a user wants, so that a user can test whether the display device is manufactured normally.

Further, the controller 30 can collect information about the abnormal video signal output from the personal computer 41 and regenerate a desired video signal, thereby inspecting the display device. Also, the controller 30 can adjust the frequency, level, and so forth, of the detected video signal of the personal computer 41 for inspecting the display device.

Thus, it is possible to easily repair and maintain the reliability and robust design of the display device.

As described above, embodiments of present invention provide a controller for generating a video signal, a simulation system comprising the same, and a method of generating the video signal, in which a desired video signal is controlled to be produced and generated on the basis of information for generating the video signal input by a user.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A simulation system for generating a video signal, comprising:
   a signal generator for generating a video signal and regenerating a video signal received from an external signal source;
   a user setting part for allowing a user to set information for generating the video signal and to set information for regenerating the video signal received from an external signal source;
   a controller for controlling the signal generator to generate the video signal and regenerate the video signal received from an external signal source on the basis of the information when the information is set through the user setting part; and
   a signal analyzer for detecting and analyzing the video signal output from the external signal source, wherein the controller is configured to control the signal generator to regenerate the video signal supplied from the external signal source on the basis of an analyzed result of the signal analyzer,
   wherein the information for regenerating the video signal is used to modify the video signal during regeneration to generate a modified video signal.

2. The simulation system according to claim 1, further comprising:
   signal storage for storing information for generating the video signal, wherein the controller is configured to adjust the video signal generated by the signal generator on the basis of changed information when the information for generating the video signal stored in the signal storage is changed through the user setting part.

3. The simulation system according to claim 2, wherein the information for generating the video signal comprises at least one of frequency, level, ringing, monotonic and timing of the video signal.

4. The simulation system according to claim 1, wherein the information for generating the video signal comprises at least one of frequency, level, ringing, monotonic and timing of the video signal.

5. The simulation system according to claim 1, further comprising:
   a display, wherein the video signal generated by the signal generator is displayed in the display.

6. A control device of generating a video signal, comprising:
   a user setting part;
   a controller for providing a corresponding command to an external signal generator to generate a video signal on the basis of information for generating a video signal, and to regenerate a video signal received from an external signal source on the basis of the information when the information is set through the user setting part; and
   a signal analyzer for detecting and analyzing the video signal output from the external signal source, wherein the controller is configured to control the signal generator to regenerate the video signal supplied from the external signal source on the basis of an analyzed result of the signal analyzer,
   wherein the information for regenerating the video signal is used to modify the video signal during regeneration to generate a modified video signal.

7. The control device according to claim 6, further comprising:
   signal storage for storing information for generating the video signal, wherein the controller is configured to adjust the video signal generated by the signal generator on the basis of changed information when the information for generating the video signal stored in the signal storage is changed through the user setting part.

8. The control device according to claim 7, wherein the information for generating the video signal comprises at least one of frequency, level, ringing, monotonic and timing of the video signal.

9. The control device according to claim 6, wherein the information for generating the video signal comprises at least one of frequency, level, ringing, monotonic and timing of the video signal.

10. A method of generating a video signal, comprising the steps of:
    inputting information for generating a video signal;
    inputting information for regenerating a video signal when received from a predetermined signal source;
    regenerating a video signal when received from a predetermined signal source on the basis of the set information, and generating a video signal on the basis of the set information; and
    detecting a video signal output from the predetermined signal source, analyzing the detected video signal, and regenerating the detected video signal on the basis of the analyzed result,
    wherein the information for regenerating the video signal is used to modify the video signal during regeneration to generate a modified video signal.

11. The method according to claim 10 further comprising the steps of:
    storing information for generating the video signal; and
    adjusting the video signal to be generated on the basis of changed information when the stored information for the video signal is changed.

12. The method according to claim 11, wherein the information for generating the video signal comprises at least one of frequency, level, ringing, monotonic and timing of the video signal.

13. The method according to claim 10, wherein the information for generating the video signal comprises at least one of frequency, level, ringing, monotonic and timing of the video signal.

14. The method according to claim 10, further comprising the step of displaying a picture based on the generated video signal.

* * * * *